United States Patent [19]

Thyren et al.

[11] Patent Number: 4,713,966
[45] Date of Patent: Dec. 22, 1987

[54] METHOD AND APPARATUS FOR VOLUME MEASUREMENT

[75] Inventors: Carl H. Thyren, Malmö; Tore Hesthamar, Lund, both of Sweden

[73] Assignee: Enpece AB, Lund, Sweden

[21] Appl. No.: 916,545

[22] PCT Filed: Dec. 20, 1985

[86] PCT No.: PCT/SE85/00537
§ 371 Date: Oct. 16, 1986
§ 102(e) Date: Oct. 16, 1986

[87] PCT Pub. No.: WO86/03834
PCT Pub. Date: Jul. 3, 1986

[30] Foreign Application Priority Data

Dec. 21, 1984 [SE] Sweden .................... 8406547

[51] Int. Cl.$^4$ ............................................. G01F 17/00
[52] U.S. Cl. .................................................. 73/149
[58] Field of Search ............................. 73/149, 290 B

[56] References Cited

U.S. PATENT DOCUMENTS

| | | | |
|---|---|---|---|
| 3,237,451 | 3/1966 | Haeff | 62/3 |
| 3,411,351 | 11/1968 | Schwartz | 73/149 |
| 3,596,510 | 8/1971 | Paine | 73/149 |
| 3,769,834 | 11/1973 | Fletcher et al. | 72/149 |
| 4,184,371 | 1/1980 | Brachet | 73/149 |
| 4,474,061 | 10/1984 | Parker | 73/149 |
| 4,535,627 | 8/1985 | Prost et al. | 73/149 |
| 4,561,298 | 12/1985 | Pond | 73/149 |

FOREIGN PATENT DOCUMENTS 2601274 7/1976 Fed. Rep. of Germany ........ 73/149
2412825 7/1979 France .

OTHER PUBLICATIONS

Derwent Abstract 830757 923/36.
Derwent Abstract 84-106 441/17.

*Primary Examiner*—Stewart J. Levy
*Assistant Examiner*—Robert R. Raevis
*Attorney, Agent, or Firm*—Bacon & Thomas

[57] ABSTRACT

A method of measuring the volume (V) of a gas in a container (20) comprises varying the container volume according to a sine wave between a minimum and a maximum value, the variation being made at a constant frequency but at varying amplitude, to obtain a predetermined pressure difference ($\Delta p$), and the volume difference ($\Delta V$) corresponding to said predetermined pressure difference ($\Delta p$) being determined by detecting the points of time when at least two points on the sine wave are attained which correspond to two predetermined values of the container volume. By measuring the time between the two points on the sine wave, the sine wave peak values for the volume difference ($\Delta V$) corresponding to said predetermined pressure difference ($\Delta p$) may be calculated and, thus, the said volume difference ($\Delta V$). By means of the formula $V = \Delta V \times p_0 \times \eta / \Delta p$, wherein $p_0$ = the static pressure and $\eta = C_p/C_v$ wherein $C_p$ an $C_v$ are the specific heat capacity at, respectively, constant pressure and constant volume for the gas within the container, the gas volume (V) in the container may then be determined.

An apparatus for carrying the method into effect has also been constructed.

2 Claims, 2 Drawing Figures

METHOD AND APPARATUS FOR VOLUME MEASUREMENT

The present invention relates to a method of measuring the volume of a gas in a container, and to an apparatus for carrying said method into effect, said apparatus comprising a tubular casing which is connected at one end to an opening in the container and in which a reciprocating wall is resiliently suspended, an excitation device, and a pressure gauge within said container.

One method of measuring the volume of a gas in a container is to utilize the general law of gases for adiabatic processes, which may be expressed as $p_0 x V_0^\eta = (p_0 + \Delta P) x (V_0 - \Delta V)^\eta$. For closed containers, measuring presents no problem; it suffices to measure the pressure in the container at the volume sought, and then to change the container volume by a known amount, whereupon the pressure is measured again. However, many containers are not sealed but vented, and with such containers measuring is far more complicated. To be able to utilize the principle of the general law of gases, the pressure and the volume within the container must be changed such that venting does not affect the result, but a stable dynamic state may be achieved. This is accomplished by changing the volume and the pressure within the container at a frequency which is higher than the cut-off frequency of the low-pass filter formed by the venting duct.

U.S. Pat. No. 3,769,834 teaches a method of measuring the volume of an incompressible body enclosed within a container, by varying the volume of the gas surrounding the body in the container at a frequency between 1 and 100 Hz, and measuring the resultant change in pressure. This method has at least one great disadvantage: It requires a pressure gauge which is sensitive and accurate within a large pressure range. Such a pressure gauge is, of course, very expensive, thus making the entire measuring apparatus expensive.

An apparatus by which the volume can be measured without an expensive pressure gauge, is disclosed in FR No. 2,412,825. This apparatus comprises two containers interconnected by a membrane, one container housing the object whose volume is to be measured, and the other container being a reference container whose volume may be varied by displacement of a piston. On measurement, the pressure is varied uniformly in both containers, and the piston is controlled such that both containers are under the same pressure, the volume of the object being determined by the displacement of the piston. The disadvantage of this arrangement is obvious: The reference container makes the measurement apparatus very bulky and useless for large containers.

The above-mentioned disadvantages of an expensive pressure gauge and bulky reference container are found in all prior art apparatuses, even though they are designed in different ways.

It therefore is the object of the present invention to provide a novel measuring method permitting the volume of a gas in a vented container to be measured in a simple manner by means of a compact and inexpensive apparatus.

This object is achieved in that the container volume is varied according to a sine wave between a minimum and a maximum value, said variation being effected at a constant frequency but at a varying amplitude, in order to obtain a predetermined pressure difference ($\Delta p$); that the volume difference ($\Delta V$) corresponding to said predetermined pressure difference ($\Delta p$) is determined by detecting the points of time when at least two points on said sine wave are attained which correspond to two predetermined values of the container volume; that the time between the said two points on said sine wave is measured and used for calculating the maximum and the minimum value of the volume difference ($\Delta V$) corresponding to said predetermined pressure difference ($\Delta p$); and that the volume (V) is calculated on the basis of the formula $V = \Delta V \times p_0 \times \eta / \Delta p$ wherein $p_0$ = the static pressure and $\eta = C_p/C_v$, wherein $C_p$ and $C_v$ are the specific heat capacity at, respectively, constant pressure and constant volume of the gas within the container.

To carry the method into effect, use is made of an apparatus of the type mentioned by way of introduction, said apparatus being characterized by at least two position transducers adapted to provide a signal upon passage of said reciprocating wall, time measuring means for measuring the time between a signal from one position transducer and a subsequent signal from the other position transducer, calculating means for calculating the oscillation amplitude of said reciprocating wall on the basis of the time measured by said time measuring means, and for measuring the volume of the gas within the container.

It should here be emphasised that it is possible, by determining the gas volume of a container, also to determine the volume of a liquid or incompressible solid body stored within the container, if the container volume is known.

The invention will now be described in more detail, reference being had to the accompanying drawings illustrating an embodiment.

Figure 1:
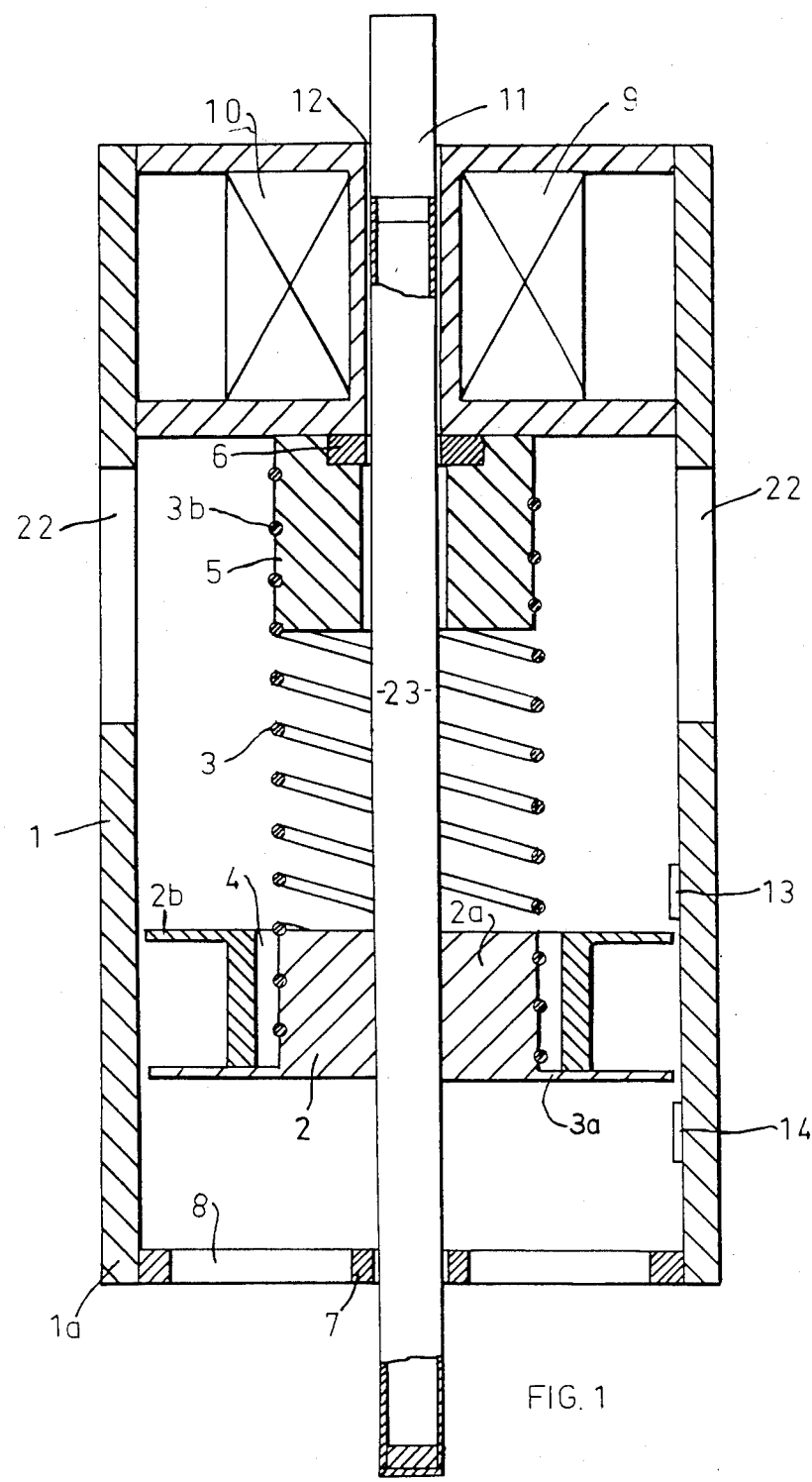
FIG. 1 shows an apparatus according to the invention for varying the volume of a container.

The apparatus shown in FIG. 1 comprises a tubular casing 1 having its one end 1a connected to an opening of a container (not shown) in which volume measurement is to be carried out, the circumferential wall of said casing having two or more apertures 22. Displaceably mounted in the casing is a piston 2, the cross-sectional area of which is somewhat smaller than the inner cross-sectional area of the casing, such that the piston has an easy running fit in the casing. Normally, a closer seal between the piston and the casing is not required, nor does the embodiment illustrated have such a seal. If desired, however, a rolling membrane or the like may be provided to give the requisite sealing action. The piston 2 is divided radially into an inner and an outer part 2a and 2b, respectively, separated by a circular recess 4. The piston 2 is mounted in the casing by means of a spring 3, one end 3a of which is secured to the inner piston part 2a, while its other end 3b is secured to the outer side of a circular spring attachment 5 connected to the casing and provided on a level with the aperture 22 therein. The spring 3 should be so dimensioned that it can operate as a compression and tension spring without folding. In other words, it should have a diameter which is large in relation to its length. A piston rod 23 in the form of an elongate aluminium tube is extending through the center of the piston and in the longitudinal direction of the casing, the piston rod being fixedly connected to the piston. The piston rod serves to guide the piston 2 to impart to it an easy running fit within the casing 1, and therefore extends through an upper guide bearing 6 at the upper spring attachment and a lower guide bearing 7 at the opening in the container. The lower guide bearing 7 is circular and is mounted by means of a number of spokes 8 extending radially from the bearing to the casing. Furthermore, the piston rod serves to transfer excitation energy from an electromagnetic excitation means 9 mounted above the upper guide bearing 6 and the spring attachment 5. The excitation means 9 consists of a coil 10, the windings of which lie in the horizontal plane of the casing, an iron core 11 mounted on the piston rod end facing the coil, and displaceable through a center hole 12 in the coil 10, and a circuit (not shown) connected to the coil 10. For detecting the position of the piston in the casing, two transducers 13, 14 of conventional type are provided at a distance from one another in the direction of travel of the piston.

Figure 2:
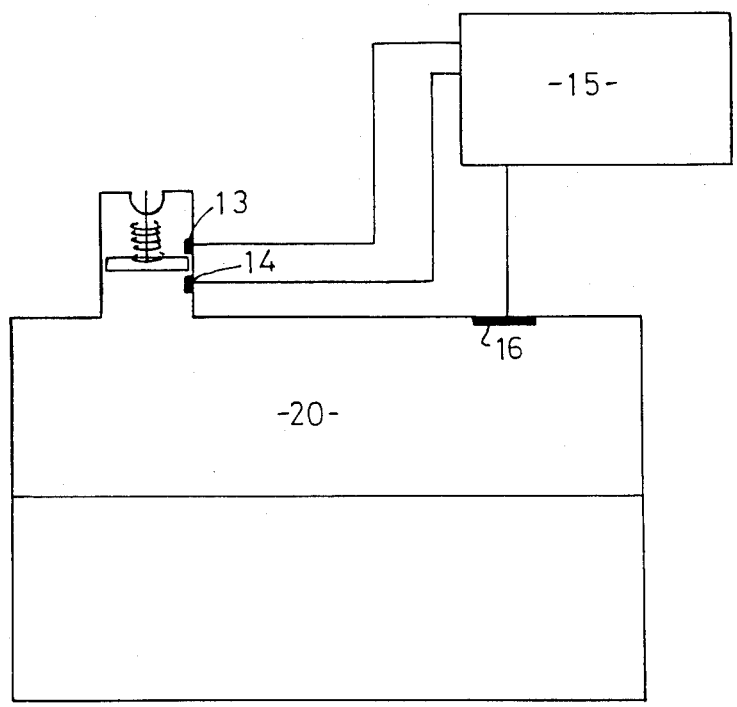
FIG. 2 is a schematic view showing the collection of volume measurement data into a computer.

FIG. 2 illustrates schematically the apparatus shown in FIG. 1 connected to a container 20 within which volume measurement is to be effected. As will appear, the two transducers 13, 14 of the casing are connected to a calculating means 15, such as a microcomputer to which is connected also a pressure gauge 16 which is mounted in the container and which, in a preferred embodiment of the invention, is a pressure control device.

The use of the device for measuring the volume of a fluid in a container will now be described. First of all, if volume measurement is to be carried out in a vented tank, the frequency of the volume change must be such that venting will affect the measurement as little as possible. Since venting operates in the manner of a low-pass filter, the frequency of the volume change must be far higher than the cut-off frequency of the filter, and this can be achieved by selecting suitable dimensions for the venting duct.

During the actual measurement, the piston is set in motion by sending a current pulse of suitable pulse width and amplitude through the coil when the piston is in its upper end position, the time of which is determined in the computer by, for example, derivation of the oscillation signal. As a result of this excitation principle, the piston, during its reciprocating movement in the casing, follows with great accuracy a sine wave whose oscillation frequency is very stable. The amplitude of the piston movement is increased continuously until the container is under a predetermined pressure which differs from the initial pressure po by a predetermined amount $\Delta p/2$, and the pressure control device responds. When this pressure has been reached, the time it takes the piston to pass from one position transducer 13, 14 to the other position transducer 14, 13 is measured, and the computer 15 uses this time to calculate the peak-to-peak value of the sine wave, i.e. the distance between the end positions of the piston. Since the cross-sectional area of the piston is known, the volume change $\Delta V$ corresponding to the predetermined pressure difference $\Delta p$ may be calculated, and thus the sought volume V may be determined from the general law of gases which, rewritten and Maclaurin-developed, may be expressed as $$V = \frac{\Delta V \cdot po \cdot \eta}{\Delta p},$$

wherein $\Delta V$=the volume change at the predetermined pressure difference $\Delta p$, po=the initial pressure, and $\eta = Cp/Cv$, wherein Cp and Cv=the specific heat capacity at, respectively, constant pressure and constant volume of the gas in the container. If one wishes to determine the volume of a liquid enclosed within the container, V is a measure of the volume of the gas above the liquid, and the liquid volume is obtained by subtracting V from the total container volume. The volume of an incompressible solid body enclosed within the container is determined in the same manner.

To eliminate the effect of $po \cdot \eta$, two successive measurements may be carried out, $\Delta V$ being determined for two different container volumes. The container volume may be changed by, for example, changing the neutral position of the piston.

If the above-mentioned method involving elimination of $po \cdot \eta$ is not used, po is determined by means of a conventional pressure gauge and $\eta$ from a table, depending upon the container contents and the desired accuracy.

In potentially explosive environments, such as petrol tanks, using an electromagnetic excitation device is less suitable and, in some cases, even prohibited by law and regulations. In these applications, the excitation device shown in FIG. 1 may be replaced by a device which operates the piston rod mechanically and is driven by hydraulic or pneumatic means, but which otherwise does not change the underlying principle of the invention.

The apparatus according to the present invention has many advantages. A measurement during which $\Delta p$ is maintained constant, gives a more stable condition in the container. In this type of measurement, one also obviates the problem that $\Delta p$ may approach infinity when the tank gets full, and thus also the requirement for a pressure gauge of high accuracy over a large range may be eliminated. In the apparatus according to the present invention, the pressure gauge thus may be a simple pressure control device. Furthermore, the novel design of the apparatus permits the piston hub to be varied continuously and in exact agreement with a sine wave, whereby the determination of the magnitude of the piston travel is simplified. An apparatus in which the piston movement does not take place in this highly exact manner, would require a linear transducer (actually, such a transducer may be used also in the apparatus according to the present invention), but such a transducer is very expensive.

The above described embodiment of the present invention is, of course, but an example and many modications within the scope of the appended claims are conceivable. For instance, the spring may be replaced by several interconnected springs, the mutual positions of the parts may be changed, etc. Furthermore, the movable wall may be a membrane or a loudspeaker element instead of a piston.

We claim:

1. A method of measuring the volume (v) of a gas in a container, comprising varying the container volume according to a sine wave between a minimum and a maximum value, said variation being effected at a constant frequency but at a varying amplitude, in order to obtain a predetermined pressure difference ($\Delta p$) of the gas in the container; determining the volume difference ($\Delta V$) corresponding to said predetermined pressure difference ($\Delta p$) by detecting the points of time when at least two points on said sine wave are attained which correspond to two predetermined values of the container volume; measuring the time between the said two points on said sine wave and using said measurement for calculating the maximum and the minimum value of the volume (V), which are used for calculating the volume difference (ΔV) corresponding to said predetermined pressure difference (Δp); and calculating the volume (V) on the basis of the formula $V = \Delta V \times p_0 \times \eta / \Delta p$ wherein $p_0$ = the static pressure and $\eta = C_p/C_v$, wherein Cp and Cv are the specific heat capacity at, respectively, constant pressure and constant volume of the gas within the container.

2. A method as claimed in claim 1, wherein measuring is repeated for a different value of the container volume, whereupon the gas volume may be calculated without determining $p_0 \times \eta$.

* * * * *